US012706864B2

(12) United States Patent
Kim et al.

(10) Patent No.: US 12,706,864 B2
(45) Date of Patent: Aug. 11, 2026

(54) GATEWAY APPARATUS AND CONTROL METHOD THEREOF

(71) Applicants: Hyundai Motor Company, Seoul (KR); Kia Corporation, Seoul (KR)

(72) Inventors: Sung Gu Kim, Seoul (KR); Tae Gil Kim, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 312 days.

(21) Appl. No.: 18/530,977

(22) Filed: Dec. 6, 2023

(65) Prior Publication Data

US 2025/0023832 A1 Jan. 16, 2025

(30) Foreign Application Priority Data

Jul. 11, 2023 (KR) ........................ 10-2023-0089898

(51) Int. Cl.
*H04L 49/90* (2022.01)
*H04L 12/66* (2006.01)

(52) U.S. Cl.
CPC .............. *H04L 49/90* (2013.01); *H04L 12/66* (2013.01)

(58) Field of Classification Search
CPC ... H04W 52/02; H04W 28/02; H04W 72/121; H04W 72/25; H04W 72/543; H04W 12/08; H04W 76/14; H04W 76/11; H04L 49/90; H04L 12/66
See application file for complete search history.

(56) References Cited

U.S. PATENT DOCUMENTS

2006/0271694 A1 11/2006 Matsuo et al.
2010/0014459 A1* 1/2010 Mir ........................ H04L 45/60 370/328
2010/0329272 A1 12/2010 Tsuboi et al.
2012/0084482 A1 4/2012 Yamanaka et al.
2022/0053389 A1* 2/2022 Yiu ...................... H04W 28/06

FOREIGN PATENT DOCUMENTS

JP 2007-318199 A 12/2007
JP 2019-9636 A 1/2019
JP 2021-19284 A 2/2021

* cited by examiner

*Primary Examiner* — Iqbal Zaidi
(74) *Attorney, Agent, or Firm* — Banner & Witcoff, Ltd.

(57) ABSTRACT

A gateway apparatus is provided. The gateway apparatus includes memory storing computer-executable instructions and at least one processor that executes the instructions. The gateway apparatus selects a first protocol data unit (PDU) to be sent from a first network node to a second network node different from the first network node, based on the first PDU being sent to a router, searches, within a shared buffer associated with a routing path of the router, for a second PDU different from the first PDU, stores, based on determining that the second PDU is stored in the shared buffer, the first PDU in the shared buffer, and sends, to the second network node and after deleting the second PDU from the shared buffer, the first PDU.

20 Claims, 8 Drawing Sheets

| | CONVENTIONAL | | GATE APPARATUS |
|---|---|---|---|
| | STmin = 2.0ms | STmin = 0.3ms | STmin = 0.0ms |
| 4M TRANSMISSION TIME (NUMBER OF MESSAGES * TRANSMISSION TIME PER MESSAGE) | 114,286ms | 114,286ms | 114,286ms |
| MESSAGE INTERVAL TIME (NUMBER OF MESSAGES * INTERVAL BETWEEN MESSAGES) | 1,142,858ms | 171,429ms | 0 |
| TOTAL TIME | 1,257,143.8ms (ABOUT 21 MINUTES) | 285,715ms (ABOUT 4.8 MINUTES) | 114,286ms (ABOUT 1.9 MINUTES) |

FIG.7

GATEWAY APPARATUS AND CONTROL METHOD THEREOF

CROSS-REFERENCE TO RELATED APPLICATION

This application claims the benefit of priority to Korean Patent Application No. 10-2023-0089898, filed in the Korean Intellectual Property Office on Jul. 11, 2023, the entire contents of which are incorporated herein by reference.

TECHNICAL FIELD

The present disclosure relates to a gateway apparatus and a control method thereof, and more particularly, relates to technologies for efficiently improving an operation required for reprogramming.

BACKGROUND

A vehicle may include a plurality of electronic control units (ECUs) for performing different functionalities to control operations of an engine and other electronic devices according to a driving state.

The ECU may perform operations based on algorithms that were loaded at the time of production of the vehicle. Furthermore, the ECU may store data associated with an operation or control of the ECU in read-only memory (ROM). The functionalities of an ECU may constantly evolve, and new functionalities may be added to the ECU after the vehicle is manufactured and even after it is purchased by a customer.

The purpose of updating software of the ECU may not be limited to improving the existing functionalities of the vehicle and the ECU, but may extend to patching bugs and finetuning the software of the ECU. As such, the operation of updating the software of the ECU is referred to as reprogramming.

Thus, an efficient and improved operation of reprogramming can be beneficial.

SUMMARY

The present disclosure has been made to solve the above-mentioned problems occurring in the prior art while advantages achieved by the prior art are maintained intact.

An aspect of the present disclosure provides a gateway apparatus for storing a protocol data unit (PDU) transmitted from a first module in one shared buffer and transmitting the stored PDU to a second module and a control method thereof.

Another aspect of the present disclosure provides a gateway apparatus for searching for indexes paired with a plurality of PDUs stored in a shared buffer of a router module using a binary search and transmitting the found PDUs to a module different from the first module to transmit a PDU transmitted from the first module to the shared buffer to the module different from the first module and a control method thereof.

The technical problems to be solved by the present disclosure are not limited to the aforementioned problems, and any other technical problems not mentioned herein will be clearly understood from the following description by those skilled in the art to which the present disclosure pertains.

According to one or more example embodiments of the present disclosure, a gateway apparatus may include: at least one processor; and memory. The memory may store instructions that, when executed by the at least one processor, cause the gateway apparatus to: select a first protocol data unit (PDU) to be sent from a first network node to a second network node different from the first network node; based on the first PDU being sent to a router, search, within a shared buffer associated with a routing path of the router, for a second PDU different from the first PDU; store, based on determining that the second PDU is stored in the shared buffer, the first PDU in the shared buffer; and send, to the second network node and after deleting the second PDU from the shared buffer, the first PDU.

The instructions, when executed by the at least one processor, may further cause the gateway apparatus to set, based on the first PDU being stored in the shared buffer, a delay time associated with a controller area network (CAN) communication protocol.

The instructions, when executed by the at least one processor, may further cause the gateway apparatus to store, in the shared buffer and together with the first PDU, an index paired with the first PDU.

The index may indicate the second network node.

The instructions, when executed by the at least one processor, may further cause the gateway apparatus to search, based on the second PDU being deleted from the shared buffer, the shared buffer for an index paired with the second PDU.

The instructions, when executed by the at least one processor, may further cause the gateway apparatus to: sort a plurality of PDUs based on a plurality of indexes stored in the shared buffer; and perform a first search, among indexes paired with the sorted PDUs and using binary search, for a target index, of the plurality of indexes, that is equal to as the index paired with the second PDU.

The instructions, when executed by the at least one processor, may further cause the gateway apparatus to: delete, from the shared buffer and based on finding the target index via the first search, a third PDU paired with the target index; and perform a second search, among the plurality of indexes stored in the shared buffer and using binary search, for the target index.

The instructions, when executed by the at least one processor, may further cause the gateway apparatus to send, based on not finding the target index via the second search, the first PDU to the second network node.

The instructions, when executed by the at least one processor, may further cause the gateway apparatus to: delete, from the shared buffer based on a time at which at least one of the plurality of PDUs paired with the target index is stored in the shared buffer and further based on the target index including a plurality of target indexes, the at least one of the plurality of PDUs; and perform a second search, among the plurality of indexes stored in the shared buffer and using binary search, for the target index.

The instructions, when executed by the at least one processor, may further cause the gateway apparatus to perform, based on the first PDU being sent to the second network node, reprogramming of an electronic control unit (ECU) associated with the first PDU.

According to one or more example embodiments of the present disclosure, a gateway control method may include: selecting a first protocol data unit (PDU) to be sent from a first network node to a second network node different from the first network node; based on the first PDU being sent to a router, searching, within a shared buffer associated with a routing path of the router, for a second PDU different from the first PDU; storing, based on determining that the second PDU is stored in the shared buffer, the first PDU in the shared buffer; and sending, to the second network node and after deleting the second PDU from the shared buffer, the first PDU.

Storing the first PDU may include setting, based on the first PDU being stored in the shared buffer, a delay time associated with a controller area network (CAN) communication protocol.

Storing the first PDU may include: storing, in the shared buffer and together with the first PDU, an index paired with the first PDU.

The index may indicate the second network node.

The gateway control method may further include: searching, based on the second PDU being deleted from the shared buffer, the shared buffer for an index paired with the second PDU.

Searching for the index paired with the second PDU may include: sorting a plurality of PDUs based on a plurality of indexes stored in the shared buffer; and performing a first search, among indexes paired with the sorted PDUs and using binary search, for a target index, of the plurality of indexes, that is equal to as the index paired with the second PDU.

Performing the first search may include: deleting, from the shared buffer and based on finding the target index via the first search, a third PDU paired with the target index; and performing a second search, among the plurality of indexes stored in the shared buffer and using binary search, for the target index.

Performing the second search may include: sending, based on not finding the target index via the second search, the first PDU to the second network node.

Performing the first search may include: deleting, from the shared buffer based on a time at which at least one of the plurality of PDUs paired with the target index is stored in the shared buffer and further based on the target index including a plurality of target indexes, the at least one of the plurality of PDUs; and performing a second search, among the plurality of indexes stored in the shared buffer and using binary search, for the target index.

The gateway control method may further include: performing, based on the first PDU being sent to the second network node, reprogramming of an electronic control unit (ECU) associated with the first PDU.

BRIEF DESCRIPTION OF THE DRAWINGS

The above and other objects, features and advantages of the present disclosure will be more apparent from the following detailed description taken in conjunction with the accompanying drawings:

FIG. 7 is a drawing for describing an example of the result of performing a reprogramming procedure in a gateway apparatus;

Figure 1:
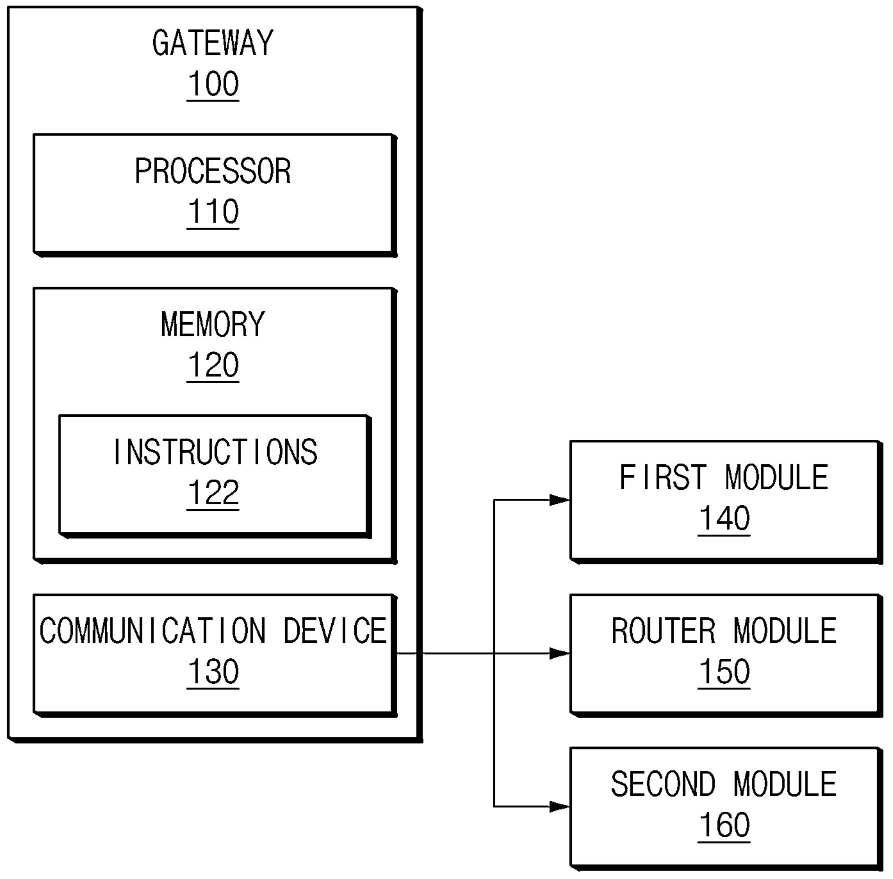
FIG. 1 is a drawing illustrating a gateway apparatus.

With regard to description of drawings, the same or similar denotations may be used for the same or similar components.

DETAILED DESCRIPTION

Hereinafter, one or more example embodiments of the present disclosure will be described in detail with reference to the exemplary drawings. In the drawings, the same reference numerals will be used throughout to designate the same or equivalent components. In addition, a detailed description of well-known features or functions will be ruled out in order not to unnecessarily obscure the gist of the present disclosure. Hereinafter, various example embodiments of the present disclosure may be described with reference to the accompanying drawings. However, it should be understood that this is not intended to limit the present disclosure to specific implementation forms and includes various modifications, equivalents, and/or alternatives of embodiments of the present disclosure. With regard to description of drawings, similar components may be marked by similar reference numerals.

In describing components of example embodiments of the present disclosure, the terms first, second, A, B, (a), (b), and the like may be used herein. These terms are only used to distinguish one component from another component, but do not limit the corresponding components irrespective of the order or priority of the corresponding components. Furthermore, unless otherwise defined, all terms including technical and scientific terms used herein are to be interpreted as is customary in the art to which this present disclosure belongs. It will be understood that terms used herein should be interpreted as having a meaning that is consistent with their meaning in the context of this present disclosure and the relevant art and will not be interpreted in an idealized or overly formal sense unless expressly so defined herein. For example, the terms, such as "first", "second", "1st", "2nd", or the like used in the present disclosure may be used to refer to various components regardless of the order and/or the priority and to distinguish one component from another component, but do not limit the components. For example, a first user device and a second user device indicate different user devices, irrespective of the order and/or priority. For example, without departing the scope of the present disclosure, a first component may be referred to as a second component, and similarly, a second component may be referred to as a first component.

In the present disclosure, the expressions "have", "may have", "include" and "comprise", or "may include" and "may comprise" indicate existence of corresponding features (e.g., components such as numeric values, functions, operations, or parts), but do not exclude presence of additional features.

It will be understood that when a component (e.g., a component) is referred to as being "(operatively or communicatively) coupled with/to" or "connected to" another component (e.g., a second component), it can be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there is no intervening component (e.g., a third component).

According to the situation, the expression "configured to" used in the present disclosure may be used interchangeably with, for example, the expression "suitable for", "having the capacity to", "designed to", "adapted to", "made to", or "capable of".

The term "configured to" must not mean only "specifically designed to" in hardware. Instead, the expression "a device configured to" may mean that the device is "capable of" operating together with another device or other parts. For example, a "processor configured to perform A, B, and C" may mean a generic-purpose processor (e.g., a central processing unit (CPU) or an application processor) which may perform corresponding operations by executing one or more software programs which store a dedicated processor (e.g., an embedded processor) for performing a corresponding operation or a memory device. The terms of a singular form may include plural forms unless the context clearly indicates otherwise. All the terms used herein, which include technical or scientific terms, may have the same meaning that is generally understood by a person skilled in the art described in the present disclosure. It will be further understood that terms, which are defined in a dictionary and commonly used, should also be interpreted as is customary in the relevant related art and not in an idealized or overly formal detect unless expressly so defined herein in various example embodiments of the present disclosure. In some cases, even though terms are terms which are defined in the specification, they may not be interpreted to exclude embodiment(s) of the present disclosure.

In the present disclosure, the expressions "A or B", "at least one of A or/and B", or "one or more of A or/and B", and the like may include any and all combinations of the associated listed items. For example, the term "A or B", "at least one of A and B", or "at least one of A or B" may refer to all of the case (1) where at least one A is included, the case (2) where at least one B is included, or the case (3) where both of at least one A and at least one B are included. Furthermore, in describing one or more example embodiments of the present disclosure, each of such phrases as "A or B", "at least one of A and B", "at least one of A or B", "A, B, or C", "at least one of A, B, and C", "at least one of A, B, or C", and "at least one of A, B, or C, or any combination thereof" may include any one of, or all possible combinations of the items enumerated together in a corresponding one of the phrases. Particularly, the phrase such as "at least one of A, B, or C, or any combination thereof" may include "A", "B", or "C", or "AB" or "ABC", which is a combination thereof.

Hereinafter, one or more example embodiments of the present disclosure will be described in detail with reference to FIGS. 1 to 8.

FIG. 1 is a drawing illustrating a gateway apparatus.

A gateway apparatus (also referred to as a gateway) 100 may include a processor 110, a memory 120 storing instructions 122, and a communication device 130.

The gateway apparatus 100 may indicate a gateway apparatus which stores a protocol data unit (PDU) in a shared buffer (not shown) of a router module 150 to shorten a time for reprogramming of an electronic control unit (ECU) included in a vehicle. For example, the gateway apparatus 100 may transmit a PDU generated (or transmitted) by a first module 140 to the router module 150. Based on that the PDU is transmitted to the router module 150, the gateway apparatus 100 may search for a PDU which is stored in the shared buffer of the router module 150 and is different from the above-mentioned PDU. Herein, a time point when the different PDU is transmitted to the shared buffer of the router module 150 may indicate a time point earlier than a time point when the above-mentioned PDU is transmitted to the router module 150. The gateway apparatus 100 may store the PDU in the shared buffer, based on searching the shared buffer for the different PDU. Based on that the PDU is stored in the shared buffer, the gateway apparatus 100 may set a separation time (STmin) (e.g., delay or minimum separation time) about a controller area network (CAN) communication protocol to a predetermined time, thus shortening a time for reprogramming of the ECU included in the vehicle. As used herein, a module may be a network node. For example, a module may be a node in a CAN.

For reference, the vehicle may include a plurality of ECUs for performing different functions to control operations of an engine and the other devices according to a plurality of driving states. Particularly, the ECU may perform an operation by means of an algorithm predetermined at the time of releasing the vehicle. Therefore, reprogramming may be applied to the ECU to improve a function and performance of the ECU and correct an error in software.

In other words, the reprogramming may indicate an operation of updating (e.g., upgrading) software of the ECU and may specifically indicate an operation of updating the software for the purpose of updating functions of the vehicle and the ECU and correcting an error in the software of the ECU. Therefore, the reprogramming in the specification is mainly described as indicating all operations for updating the software of the ECU included in the vehicle.

In conjunction with the reprogramming, the gateway apparatus 100 may use a CAN communication protocol as an inter-vehicle communication network. In this case, the PDU may be divided into a single frame in which the size of a transmission block is not greater than 8 bytes and a consecutive frame which should be divided and transmitted into several CAN frames as the size of a transmission block is greater than 8 bytes. The gateway apparatus 100 may transmit information about a block size of a PDU block to be received through the consecutive frame and a separation time indicating a transmission period of the consecutive frame for the PDU block to the router module 150. Herein, the time required for reprogramming may be directly determined in the separation time. For example, when the separation time decreases to a minimum, a PDU to be received through a consecutive frame from the router module 150 may be omitted. In detail, when the separation time decreases, as a PDU which is not transmitted is overwritten by a newly received PDU, the omission of the PDU which is not transmitted may occur. Therefore, the time required for the reprogramming may be greater than or equal to the separation time to prevent the PDU which is not transmitted from being omitted.

The gateway apparatus 100 may transmit a PDU of the first module 140 to a second module 160 without being overwritten through the router module 150, through an operation which will be described below. For example, the gateway apparatus 100 may select a target PDU (e.g., a first PDU) to be transmitted from the first module 140 for generating a PDU to the second module 160 different from the first module 140. Herein, the selected target PDU may indicate at least one of a plurality of PDUs stored in the first module 140. The gateway apparatus 100 may transmit the target PDU to the router module 150. In detail, the gateway apparatus 100 may transmit the target PDU to the router module 150 through the communication device 130. For reference, an example of transmitting the target PDU from the first module 140 to the second module 160 is mainly described for convenience of description in the specification, but not limited thereto. For example, the target PDU may be transmitted from the first module 140 to a plurality of modules different from the first module 140 or the same module as the first module 140.

The first module 140 may indicate an interface module about the CAN communication protocol. In detail, the first module 140 may be an interface module about the CAN communication protocol, which generates a PDU. However, the first module 140 is not limited thereto. For example, the first module 140 may be an interface module which identifies and transmits an identification number of a PDU received from a CAN communication controller (not shown) to the second module 160 different from the first module 140.

The router module 150 may indicate a module for routing a PDU based on a routing table and a routing engine. For example, the routing module 150 may route a PDU through the shared buffer.

The second module 160 may be a module different from the first module 140, which may indicate an interface module of a layer different from a layer of the first module 140. For reference, for convenience of description in the specification, the second module 160 is mainly described as a module for receiving the PDU generated by the first module 140. However, the second module 160 is not limited thereto. For example, the second module 160 may be a module for performing the same operation as the first module 140, which may be an interface module of the same layer as the layer of the first module 140.

The gateway apparatus 100 may search a shared buffer with which a routing path of the router module 150 is connected in common for a PDU (e.g., a second PDU) different from the target PDU, based on that the target PDU is transmitted to the router module 150. Herein, when the different PDU is found, it may indicate a PDU which should be deleted and transmitted from the router module 150, which is earlier than the target PDU.

The gateway apparatus 100 may store the target PDU in the shared buffer of the router module 150, based on that the different PDU is found. For example, when the gateway apparatus 100 does not store the target PDU in the shared buffer of the router module 150 and transmits the target PDU to the second module 160, the different PDU may be overwritten by the target PDU. In other words, the gateway apparatus 100 may store the target PDU in the shared buffer of the router module 150 to prevent the different PDU from being omitted or overwritten.

The gateway apparatus 100 may delete the different PDU from the shared buffer to transmit the target PDU to the second module 160. The gateway apparatus 100 may transmit the different PDU from the shared buffer to the second module 160.

In detail, the gateway apparatus 100 may transmit the target PDU, transmitted from the first module 140, to the second module 160 through the router module 150 by means of three methods described below.

In the first method, the gateway apparatus 100 may delete and transmit the PDU different from the target PDU from the router module 150 depending on the separation time. However, when the separation time is less than or equal to a predetermined time, the different PDU may be overwritten by the target PDU. For example, when a time from a first time point when the different PDU is deleted and transmitted from the router module 150 to a second time point when the target PDU is transmitted to the router module 150 is less than or equal to the separation time, the different PDU may be overwritten by the target PDU.

In the second method, to address the above-mentioned problem, the gateway apparatus 100 may use a plurality of buffers with which the routing path of the router module 150 is separately connected. For example, the gateway apparatus 100 may store the different PDU in a buffer allocated to a first routing path in the router module 150 and may store a target PDU in a buffer allocated to a second routing path. Herein, although a time from a first time point when the different PDU is deleted and transmitted from the buffer allocated to the first routing path to a second time point when the target PDU is transmitted to the buffer allocated to the second routing path is less than or equal to the separation time, the different PDU may fail to be overwritten by the target PDU. In other words, as each of the plurality of pieces of data is stored in a separate buffer, the above-mentioned problem may be addressed without being directly influenced by the separation time. However, in this case, because the buffer is allocated for each routing path, the memory usage of a vehicle micro controller unit (MCU) may be increased by a multiple of the above-mentioned routing path. A detailed description of it will be given below with reference to FIG. 4.

In the third method, to address the problems of the first method and the second method, the gateway apparatus 100 may use the shared buffer in the router module 150. For example, the shared buffer may indicate a shared buffer which is allocated in common to the respective routing paths as the respective routing paths are connected in common. When the target PDU is transmitted to the router module 150, the gateway apparatus 100 may search the shared buffer for the PDU different from the target PDU and may store the target PDU in the shared buffer. Furthermore, the gateway apparatus 100 may delete and transmit the different PDU from the shared buffer to transmit the target PDU to the second module 160. In other words, although the separation time is minimized, the gateway apparatus 100 may store the PDU (e.g., the different PDU) previously transmitted to the router module 150 in the shared buffer and may also store the PDU (e.g., the target PDU) to be newly transmitted, thus preventing the previously transmitted PDU from being overwritten by the PDU to be newly transmitted. A detailed description associated with it will be given below with reference to FIG. 5.

The processor 110 may execute software and may control at least one other component (e.g., a hardware or software component) connected with the processor 110. In addition, the processor 110 may perform a variety of data processing or calculation. For example, the processor 110 may store the PDU, the target PDU, and the PDU different from the target PDU in the memory 120.

For reference, the processor 110 may perform all operations performed by the gateway apparatus 100. Therefore, for convenience of description in the specification, the operation performed by the gateway apparatus 100 is mainly described as an operation performed by the processor 110. Furthermore, for convenience of description in the specification, the processor 110 is mainly described as, but not limited to, one processor. For example, the gateway apparatus 100 may include at least one processor. Each of the at least one processor may perform all operations associated with a gateway operation.

The memory 120 may temporarily and/or permanently store various pieces of data and/or information required to perform a gateway operation. For example, the memory 120 may store the PDU, the target PDU, and the PDU different from the target PDU.

The communication device 130 may assist in performing communication between the gateway apparatus 100 and the first module 140, the router module 150, and the second module 160. For example, the communication device 130 may include one or more components to perform communication between the gateway apparatus 100 and the first module 140, the router module 150, and the second module 160. For example, the communication device 130 may include a short range wireless communication unit, a microphone, or the like. At this time, a short range communication technology may be, but is not limited to, a wireless LAN (Wi-Fi), Bluetooth, ZigBee, Wi-Fi Direct (WFD), ultra-wideband (UWB), infrared data association (IrDA), Bluetooth low energy (BLE), near field communication (NFC), or the like.

Figure 2:
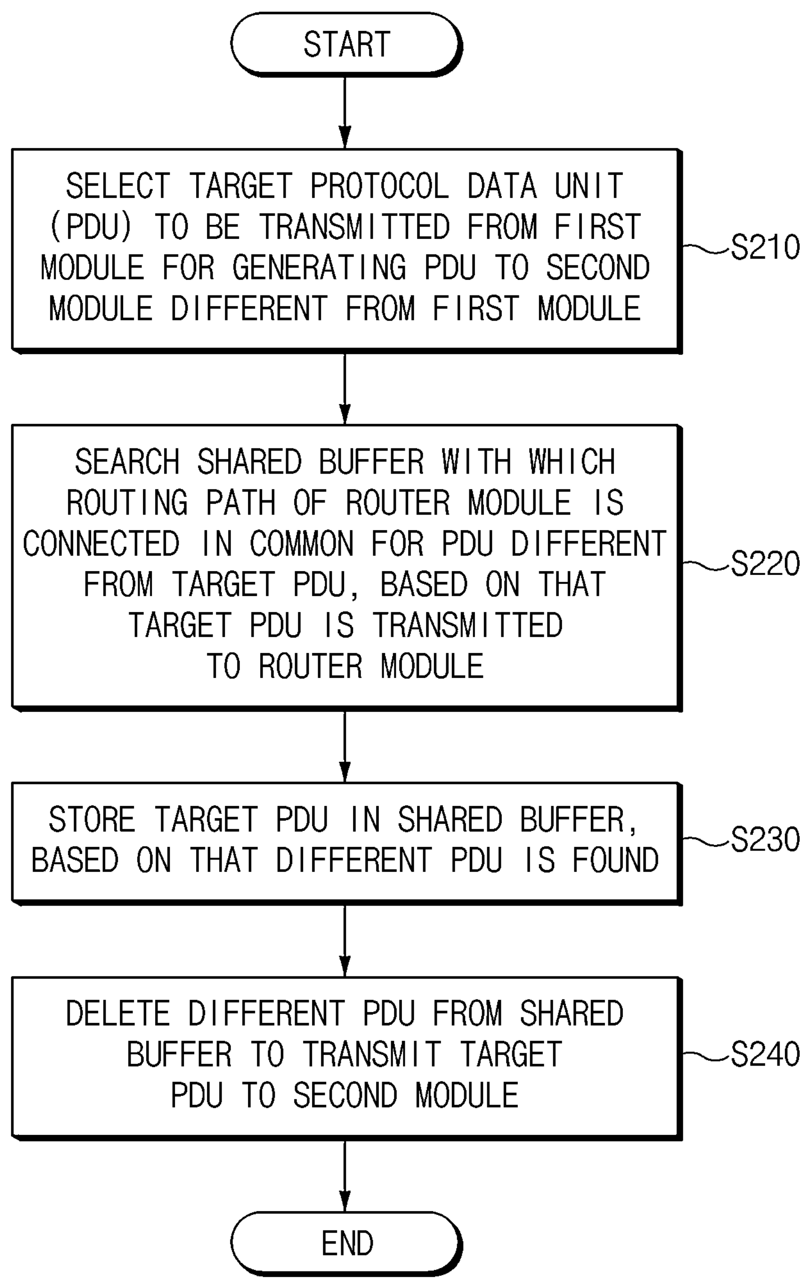
FIG. 2 is a flowchart for describing a gateway control method.

FIG. 2 is a flowchart for describing a gateway control method.

In S210, a gateway apparatus (e.g., a gateway apparatus 100 of FIG. 1) may select a target PDU to be transmitted from a first module (e.g., a first module 140 of FIG. 1) for generating a PDU and a second module (e.g., a second module 160 of FIG. 2) different from the first module. For example, the PDU may include a message for reprogramming of an ECU (e.g., a diagnostic message or a message for updating software).

In S220, the gateway apparatus may search a shared buffer with which a routing path of a router module (e.g., a router module 150 of FIG. 1) is connected in common for a PDU different from the target PDU, based on that the target PDU is transmitted to the router module. Herein, the PDU different from the target PDU may be data which is stored earlier than the target PDU in the shared buffer in chronological order or in priority. Furthermore, the PDU different from the target PDU may be data which should be deleted and transmitted from the shared buffer earlier than the target PDU in chronological order.

For reference, the operation of deleting the data from the shared buffer may include an operation of transmitting the data from the shared buffer to a module (e.g., the second module or the like). Therefore, for convenience of description in the specification, the operation of deleting the PDU from the shared buffer is described as including an operation of transmitting the PDU from the shared buffer to a module different from the first module.

In S230, the gateway apparatus may store the target PDU in the shared buffer, based on that the different PDU is found. For example, when the different PDU is not found from the router module or the shared buffer, the gateway apparatus may transmit the target PDU to the second module. Otherwise, when the different PDU is found from the router module or the shared buffer, the gateway apparatus may store the target PDU in the shared buffer to prevent the different PDU from being overwritten.

The gateway apparatus may set a separation time about a CAN communication protocol to a predetermined time, based on that the target PDU is stored in the shared buffer. As described above, the gateway apparatus may store the PDU previously transmitted to the router module and the PDU to be newly transmitted to the router module in the shared buffer, thus preventing the previously transmitted PDU from being overwritten by the PDU to be newly transmitted. At this time, the gateway apparatus may set a separation time indicating a transmission period of a consecutive frame (e.g., a transmission period of the previously transmitted PDU and the PDU to be newly transmitted) to 0.0 ms. In other words, although setting the separation time to 0.0 ms through the shared buffer, the gateway apparatus may prevent the previously transmitted PDU from being overwritten by the PDU to be newly transmitted.

When storing the target PDU in the shared buffer, the gateway apparatus may store an index paired with the target PDU together with the target PDU in the shared buffer. Herein, the index may indicate an index about the second module to which the target PDU will be transmitted.

In S240, the gateway apparatus may delete and transmit the different PDU from the shared buffer to transmit the target PDU to the second module. For example, the gateway apparatus may delete and transmit the different PDU having a higher priority in transmission than the target PDU from the shared buffer to transmit the target PDU to the second module.

Before transmitting the target PDU to the second module, the gateway apparatus may perform the following operations. For example, the gateway apparatus may search the shared buffer for the index paired with the different PDU, based on that the different PDU is deleted and transmitted from the shared buffer.

The gateway apparatus may perform a first search for sorting a plurality of PDUs on the basis of a plurality of indexes stored in the shared buffer and searching for the same target index as the index paired with the different PDU among indexes paired with the sorted PDUs using a binary search. The target index found as the first search is performed may indicate an index of the module to which the different PDU is transmitted from the shared buffer. In other words, the gateway apparatus may search for the target index to search for PDUs to be transmitted to the module to which the different PDU is transmitted.

For reference, the first search is not limited to the binary search operation. For example, the first search may indicate searching for the same target index as the index paired with the different PDU, among indexes paired with PDUs sorted using at least one of a merge sort, a heap sort, a quick sort, a tree sort, or a radix sort, or any combination thereof, using at least one of a linear search, a hash search, or a search using a binary search tree, or any combination thereof.

The gateway apparatus may delete the PDU paired with the target index from the shared buffer, based on that the first search is performed and the target index is found. Thereafter, the gateway apparatus may perform a second search for searching for the target index among the plurality of indexes stored in the shared buffer using the binary search.

For example, the gateway apparatus may select the plurality of PDUs paired with the target index from the shared buffer, based on that the first search is performed and the target index is found as a plurality of indexes. The gateway apparatus may delete and transmit at least one of the plurality of selected PDUs from the shared buffer, based on a time when the at least one of the plurality of selected PDUs is stored in the shared buffer. In other words, the gateway apparatus may first delete and transmit a PDU with the longest time when stored in the shared buffer among the plurality of selected PDUs from the shared buffer. Thereafter, the gateway apparatus may perform the second search for searching for the target index among the plurality of indexes stored in the shared buffer using the binary search, thus repeatedly searching for target indexes of PDUs from which the PDU with the longest time when stored in the shared buffer is deleted among the plurality of selected PDUs.

The gateway apparatus may transmit the target PDU to the second module, based on that the second search is performed and the target index is not found (e.g., when PDUs paired with the target index are not present in the shared buffer). The gateway apparatus may perform reprogramming of an ECU which uses a PDU, based on the target PDU is transmitted to the second module.

Figure 3:
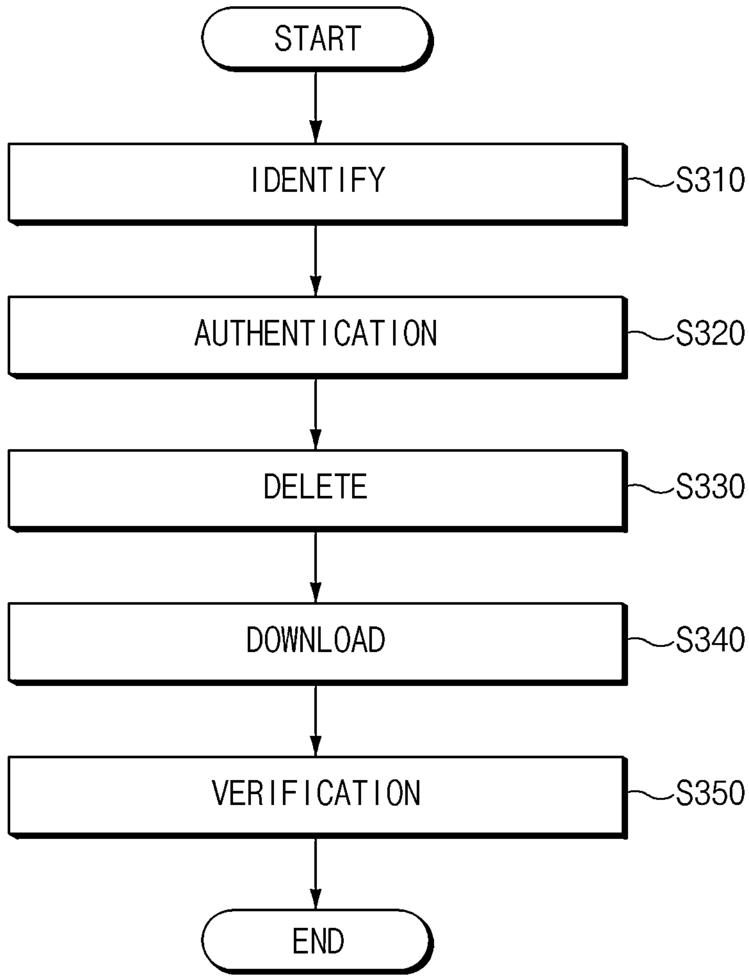
FIG. 3 is a flowchart illustrating an example of performing reprogramming in a gateway apparatus.

FIG. 3 is a flowchart illustrating an example of performing reprogramming in a gateway apparatus.

In S310, a gateway apparatus (e.g., a gateway apparatus 100 of FIG. 1) may identify hardware of an ECU and software reprogrammed before a time point when reprogramming is performed to identify a state in which the reprogramming is possible.

In S320, the gateway apparatus may perform authentication for reprogramming. For example, before performing reprogramming of the ECU, the gateway apparatus may perform authentication for the ECU.

In S330, the gateway apparatus may delete software stored in a flash memory of the ECU (e.g., software indicating a previous version of reprogrammed software).

In S340, the gateway apparatus may load (e.g., download) software, of a version different from the software stored in the flash memorym to update the software of the ECU included in a vehicle through reprogramming.

In S350, the gateway apparatus may perform verification of new software stored in the flash memory of the ECU. The gateway apparatus may perform the verification of the software to end the process of performing the reprogramming.

Figure 4:
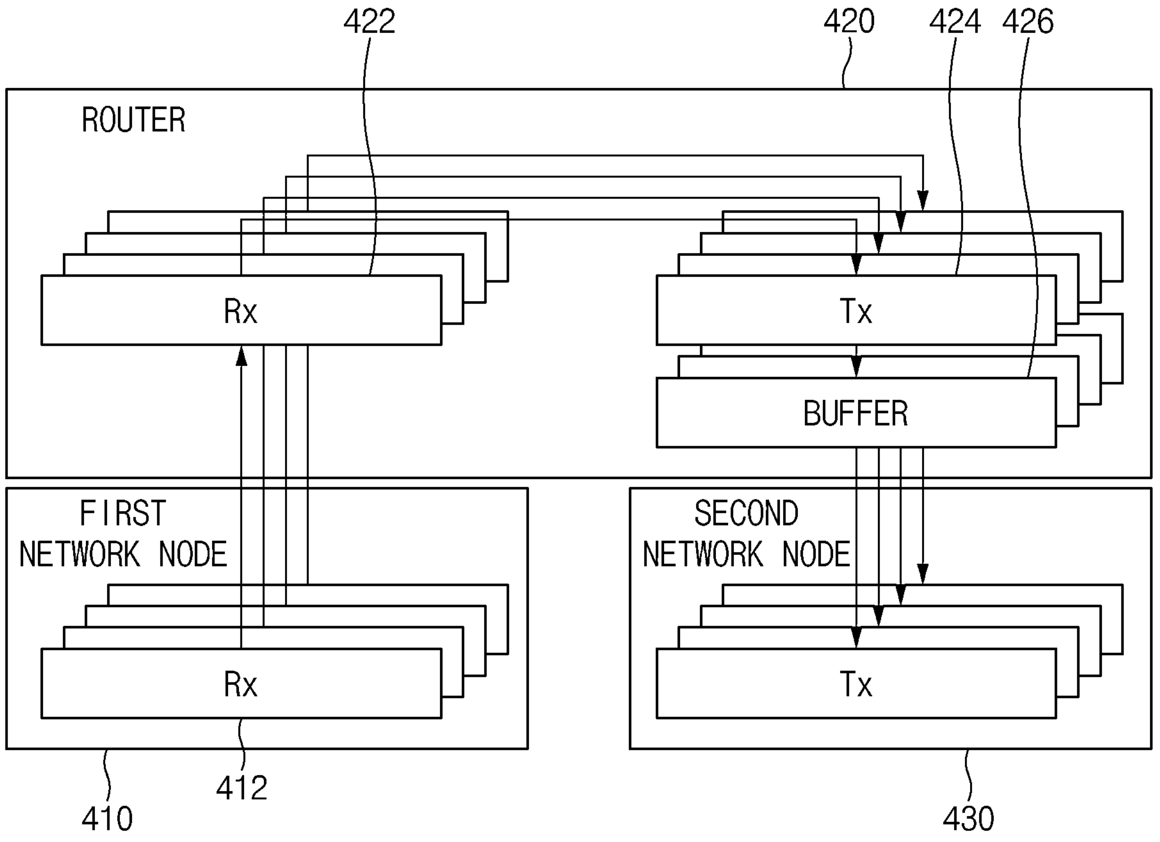
FIG. 4 is a drawing for describing an example of processing a protocol data unit (PDU) to perform reprogramming in a general gateway apparatus.

FIG. 4 is a drawing for describing an example of processing a PDU to perform reprogramming in a general gateway apparatus.

A gateway apparatus may select a target PDU 412 to be transmitted to a second module 430 among PDUs stored in a first module 410. The gateway apparatus may transmit the selected target PDU 412 to a router module 420. In detail, the gateway apparatus may transmit the selected target PDU 412 to a queue 422 at a reception side of the router module 420. For reference, the gateway apparatus described in FIG. 4 may be an apparatus different from the gateway apparatus (e.g., the gateway apparatus 100 shown in FIG. 1) described above with reference to FIGS. 1 to 3, which may indicate a general gateway apparatus.

The gateway apparatus may store the target PDU 412 in a buffer 426 separately connected with a queue 424 at a transmission side of the router module 420, based on that the target PDU 412 is transmitted to the queue 422 at the reception side of the router module 420. Herein, a routing path of the target PDU 412 may indicate a path connected from the queue 422 at the reception side of the routing path 420 to the queue 424 at the transmission side of the router module. Furthermore, the buffer 426 of the target PDU 412 may be allocated to the routing path of the target PDU 412. In other words, the buffer 426 of the target PDU 412 may be a buffer different from a buffer of a PDU different from the target PDU 412. For reference, for convenience of description in the specification, the target PDU 412 is mainly described as a PDU transmitted to the router module 420 after a time point when a different PDU is stored in the buffer.

For reference, when a CAN communication protocol is a high speed CAN (HS-CAN) communication protocol, because the first frame data length ff_dl of the transmitted PDU is set up to 0xFFF, a buffer of 4,096 bytes may be allocated for each routing path. Particularly, when 135 diagnostic messages (e.g., PDUs) are routed and when one buffer to which the size of 4,096 bytes is allocated is allocated to 135 routing paths, the memory capacity of 552,960 bytes is required.

Figure 5:
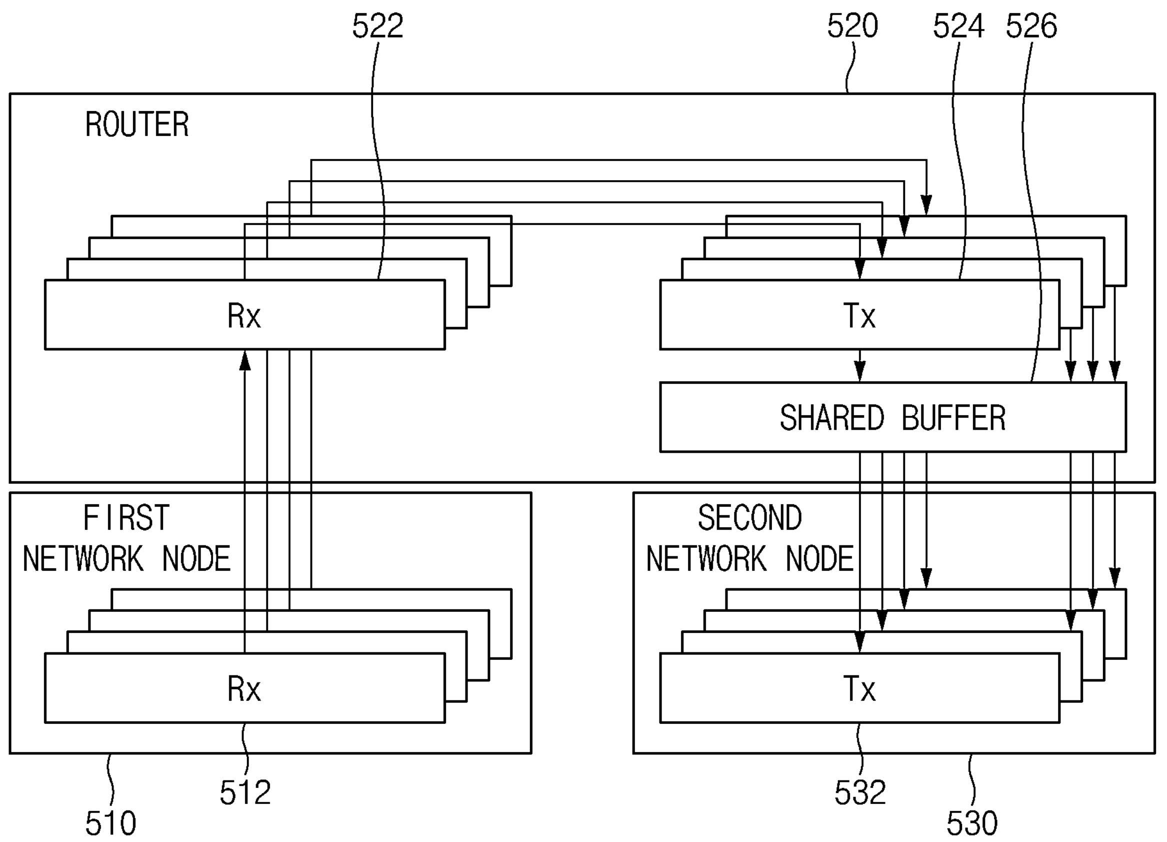
FIG. 5 is a drawing for describing an example of processing a PDU through a shared buffer to perform reprogramming in a gateway apparatus.

FIG. 5 is a drawing for describing an example of processing a PDU through a shared buffer to perform reprogramming in a gateway apparatus.

A gateway apparatus (e.g., a gateway apparatus 100 of FIG. 1) may select a target PDU 512 to be transmitted to a second module 530 among PDUs stored in a first module 510. The gateway apparatus may transmit the selected target PDU 512 to a router module 520. In detail, the gateway apparatus may transmit the selected target PDU 512 to a queue 522 at a reception side of the router module 520.

The gateway apparatus may store the target PDU 512 in a shared buffer 526 connected in common with a queue 524 at a transmission side of the router module 520, based on that the target PDU 512 is transmitted to the queue 522 at the reception side of the router module 520. For example, the gateway apparatus may search the shared buffer 526 for a PDU different from the target PDU 512, based on that the target PDU 512 is transmitted to the router module 520, and may store the target PDU 512 in the shared buffer 526, based on the different PDU is found.

Herein, a routing path of the target PDU 512 may indicate a path connected from the queue 522 at the reception side of the router module 520 to the queue 524 at the transmission side of the router module 520. Furthermore, the shared buffer 526 of the target PDU 512 may be allocated on a routing path of the PDU different from the target PDU 512 as well as a routing path of the target PDU 512. In other words, the shared buffer 526 may be a buffer with which a routing path of each of a plurality of PDUs is connected in common. Therefore, the buffer 526 of the target PDU 512 may be the same buffer as a buffer of the PDU different from the target PDU 512. For reference, for convenience of description in the specification, the target PDU 512 is mainly described as a PDU transmitted to the router module 520 after a time point when the different PDU is stored in the shared buffer 526. Furthermore, because the different PDU is a PDU to be deleted and transmitted from the shared buffer 526 earlier than the target PDU 512, it is described as a high-priority PDU.

After a time point when the high-priority PDU is deleted and transmitted from a buffer (e.g., the shared buffer 526), the gateway apparatus may delete the target PDU 512 from the shared buffer 526 and may transmit the target PDU 512 to the queue 532 at the transmission side of the second module 530. For example, the gateway apparatus may transmit the target PDU 512 to the queue 532 at the transmission side of the second module 530, based on the result of performing a first search and a second search from the shared buffer 526.

The operation of performing the first search and the second search in the gateway apparatus is as follows.

First of all, when storing a PDU in the shared buffer 526, the gateway apparatus may store an index paired with the PDU together with the PDU in the shared buffer 526. For reference, in FIG. 5, the above-mentioned index is mainly described as an index indicating a second module for convenience of description. For example, the gateway apparatus may store an index paired with the target PDU 512 (e.g., an index of the second module 530) together with the target PDU 512 in the shared buffer 526.

Next, the gateway apparatus may set a separation time about a CAN communication protocol to a predetermined time, based on that the target PDU 512 is stored in the shared buffer 526. For example, the gateway apparatus may perform routing of PDUs through the shared buffer 526 (e.g., routing from the first module 510 to the second module 530 through the router module 520) to set the separation time (e.g., a delay between transmissions) to 0.0 ms.

The gateway apparatus may delete and transmit the high-priority PDU earlier than the target PDU 512 from the shared buffer 526. For example, the gateway apparatus may delete the high-priority PDU from the shared buffer 526 and may transmit the high-priority PDU to the second module 530. However, the module to which the high-priority PDU is transmitted is not limited thereto. For example, the high-priority PDU may be transmitted to a third module (not shown) different from the second module 530. In other words, the high-priority PDU may be transmitted to the second module 530 which is a module to which the target PDU 512 will be transmitted. However, otherwise, the high-priority PDU may be transmitted to a module different from the second module 530.

The gateway apparatus may search the shared buffer 526 for an index paired with the high-priority PDU, based on that the high-priority PDU is deleted from the shared buffer 526. For example, the shared buffer 526 from which the high-priority PDU is deleted may include a first high-priority PDU, a second high-priority PDU, and the target PDU 512. At this time, the shared buffer 526 may include an index of the second module 530 (i.e., an index of the target PDU 512 to be transmitted to the second module 530), an index of the third module (i.e., an index of the first high-priority PDU to be transmitted to the third module), or the index of the third module (i.e., an index of the second high-priority PDU different from the first high-priority PDU to be transmitted to the third module, which is described above). To sum up, the shared buffer 526 may include the index of the second module 530 and the target PDU 512, the index of the third module and the first high-priority PDU, and the index of the third module and the second high-priority PDU.

The gateway apparatus may search the shared buffer 526 for an index paired with the high-priority PDU (e.g., the index of the third module), based on that the index of the high-priority PDU is the index of the third module. For example, the gateway apparatus may search for the index of the third module and the first high-priority PDU and the index of the third module and the second high-priority PDU. However, the method for searching for the index paired with the high-priority PDU is not limited thereto.

For example, the gateway apparatus may perform a first search for sorting a plurality of PDUs on the basis of a plurality of indexes stored in the shared buffer 526 and searching for the same target index as the index paired with the high-priority PDU (e.g., the index of the third module) using a binary search. In other words, the target index may be the same index as an index paired with the high-priority PDU, but may indicate an index which may be paired with the first high-priority PDU different from the high-priority PDU. As a result, the gateway apparatus may select the first high-priority PDU paired with the index of the third module and the second high-priority PDU paired with the index of the third module. In other words, the result of performing the first search may include the result of searching for the index of the third module and the first high-priority PDU and the index of the third module and the second high-priority PDU.

The gateway apparatus may delete and transmit the PDU paired with the target index from the shared buffer 526, based on that the first search is performed and the target index is found. Particularly, the gateway apparatus may delete and transmit at least one of the plurality of selected PDUs from the shared buffer 526, based on a time when the at least one of the plurality of selected PDUs is stored in the shared buffer 526. For example, the gateway apparatus may delete and transmit the first high-priority PDU paired with the index of the third module from the shared buffer 526 between the first high-priority PDU paired with the index of the third module and the second high-priority PDU paired with the index of the third module.

The gateway apparatus may perform a second search for searching for the target index among the plurality of indexes stored in the shared buffer 526 using the binary search. The result of performing the second search may include the result of searching for the index of the third module and the second high-priority PDU. The gateway apparatus may delete and transmit the second high-priority PDU paired with the index of the third module from the shared buffer 526, based on the result of performing the second search.

To sum up, the first search may include searching the shared buffer 526 for the first high-priority PDU (e.g., paired with the index of the third module), after the high-priority PDU (e.g., paired with the index of the third module) is deleted. Furthermore, the second search may include searching the shared buffer 526 for the second high-priority PDU (e.g., paired with the index of the third module), after the first high-priority PDU is deleted.

The operation after the gateway apparatus performs the first search and the second search is as follows.

The gateway apparatus may transmit the target PDU 512 to the second module 530, based on that the second search is performed and the target index (e.g., the index of the third module) is not found. The gateway apparatus may perform reprogramming of an ECU which uses a PDU, based on that the target PDU 512 is transmitted to the second module 530.

A gateway control method in which the gateway apparatus uses the shared buffer 526 may meet the following condition. For example, although the separation time is set to a minimum (e.g., 0.0 ms), the gateway apparatus may ensure routing of a PDU. Furthermore, when the CAN communication protocol is an HS-CAN communication protocol, the gateway apparatus may reduce memory usage through the shared buffer 526. A detailed description of it will be given below with reference to FIG. 7.

Figure 6:
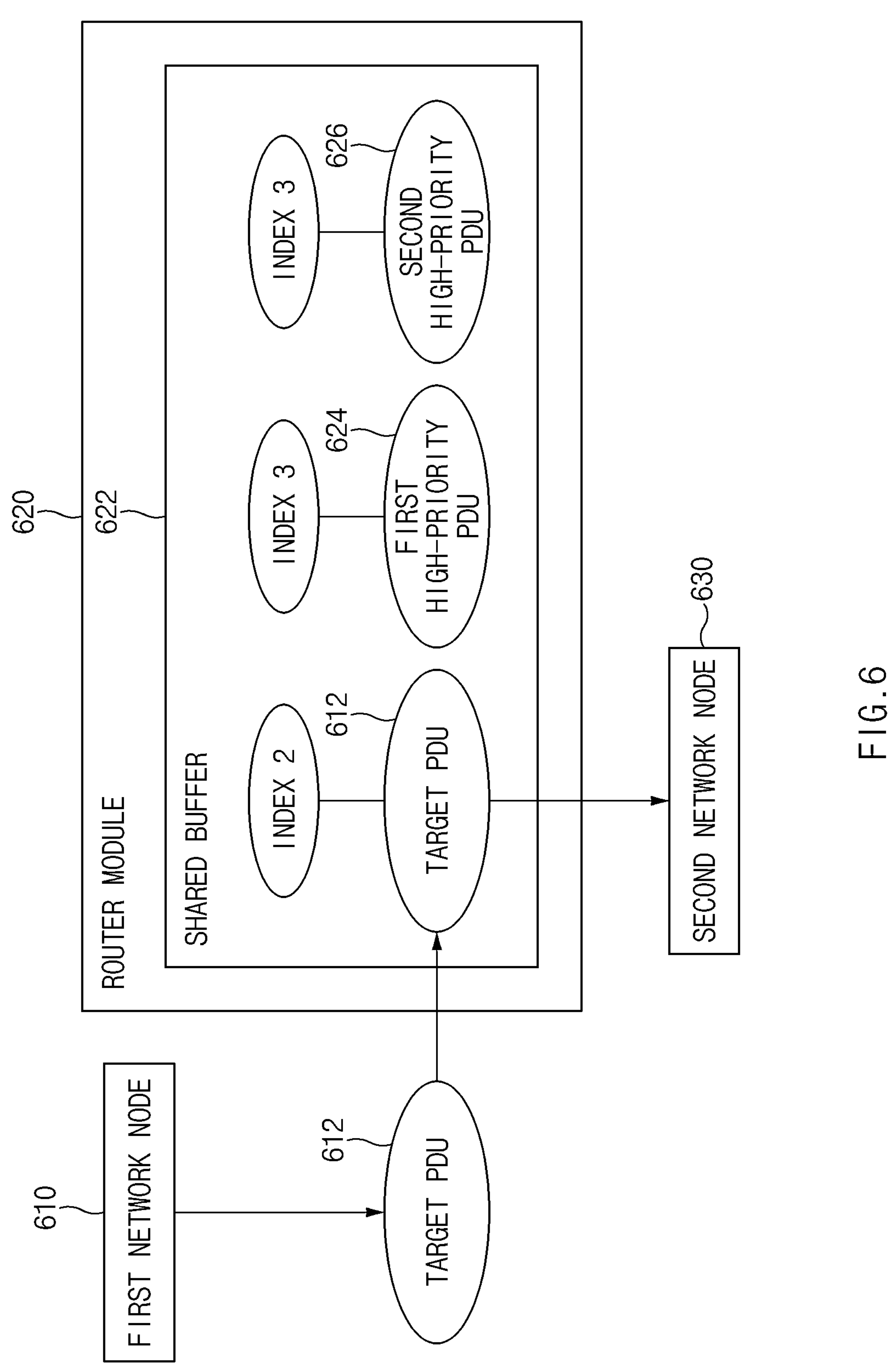
FIG. 6 is a drawing for describing an example of processing a PDU through a shared buffer in a gateway apparatus.

FIG. 6 is a drawing for describing an example of processing a PDU through a shared buffer in a gateway apparatus.

A gateway apparatus (e.g., a gateway apparatus 100 of FIG. 1) may select a target PDU 612 to be transmitted to a second module 630 among PDUs stored in a first module 610. The gateway apparatus may transmit the selected target PDU 612 to a router module 620.

The gateway apparatus may search a shared buffer 622 with which a routing path in the router module 620 is connected in common for a PDU different from the target PDU 612, based on that the target PDU 612 is transmitted to the router module 620, and may store the target PDU 612 in the shared buffer 622, based on that the different PDU is found. Herein, the different PDU may include a first high-priority PDU 624 and a second high-priority PDU 626. Furthermore, the first high-priority PDU 624 may indicate data stored in the shared buffer 622 earlier in time than the second high-priority PDU 626. In other words, the first high-priority PDU 624 may indicate a PDU to be deleted and transmitted from the buffer 622 earlier in time than the second high-priority PDU 626.

The gateway apparatus may transmit the target PDU 612 to the second module 630, based on the result of performing a first search and a second search from the shared buffer 622. For example, the gateway apparatus may search the shared buffer 622 for an index paired with the first high-priority PDU 624 (e.g., an index of a third module), based on that the first high-priority PDU 624 is deleted and transmitted from the shared buffer 622. For example, the gateway apparatus may perform the first search for sorting a plurality of PDUs on the basis of a plurality of indexes stored in the shared buffer 622 and searching for the same target index as the index paired with the first high-priority PDU 624 (e.g., the index of the third module) using a binary search.

The gateway apparatus may delete and transmit the PDU paired with the target index from the shared buffer 622, based on that the first search is performed and the target index is found. For example, the gateway apparatus may delete and transmit the second high-priority PDU 626 paired with the index of the third module from the shared buffer 622.

The gateway apparatus may perform the second search for searching for the target index among the plurality of indexes stored in the shared buffer 622 using the binary search. The gateway apparatus may transmit the target PDU 612 to the second module 630, based on that the second search is performed and the target index is not found. The gateway apparatus may perform reprogramming of an ECU which uses a PDU, based on that the target PDU 612 is transmitted to the second module 630.

FIG. 7 is a drawing for describing an example of the result of performing a reprogramming procedure in a gateway apparatus.

The result of performing reprogramming by a gateway apparatus (e.g., a gateway apparatus 100 of FIG. 1) is as follows. For reference, for convenience of description in FIG. 7, when the total amount of transmitted data is 4 megabytes, when the capacity of a PDU is 7 bytes, and when a transmission speed per PDU is 200 us, based on that a CAN communication protocol is an HS-CAN communication protocol, a condition in which the number of transmitted PDUs is 571,429 PDUs is mainly described.

For example, the gateway apparatus may use a shared buffer (e.g., a portion shown as STmin (=0.0 ms) in FIG. 7) to set a separation time about the CAN communication protocol to 0.0 ms, during operations of performing reprogramming. A transmission time of data with 4-megabyte capacity may be calculated using the number of pieces of data and a transmission time per data. Referring to FIG. 7, the transmission time of the data with the 4-megabyte capacity may be 114,286 ms. Furthermore, because the separation time (e.g., minimum separation time or STmin) is able to be set to 0.0 ms by using a shared buffer, the gateway apparatus may process 571,429 PDUs, during a time of 114,286 ms (about 1.9 minutes).

Otherwise, when the STmin is 0.3 ms (e.g., a portion shown as STmin (=0.3 ms) in FIG. 7), the transmission time of the data with the 4-megabyte capacity is described above, but a transmitted interval time (e.g., 171,429 ms) between PDUs is required. As a result, a time when 571,429 PDUs when STmin is 0.3 m is processed may be a time of 285,715 ms (about 4.8 minutes). In other words, when the shared buffer is not used and when STmin is 0.3 m, the gateway apparatus may process 571,429 PDUs during a time of 285,715 ms (about 4.8 minutes).

In addition, when STmin is 2.0 ms (e.g., a portion shown as STmin (=2.0 ms) in FIG. 7), the transmission time of the data with the 4-megabyte capacity is described above, but a transmitted interval time (e.g., 1,142,858 ms) between PDUs is required. As a result, a time when 571,429 PDUs when STmin is 2.0 ms is processed may be a time of 1,257,143.8 ms (about 21 minutes). In other words, when the shared buffer is not used and when STmin is 2.0 m, the gateway apparatus may process 571,429 PDUs during a time of 1,257,143.8 ms (about 21 minutes).

As a result, the gateway apparatus may set STmin to 0.0 ms through the shared buffer, thus improving time complexity of about 90% compared to when STmin is 2.0 ms and about 60% compared to when STmin is 0.3 ms, compared to when there is no shared buffer (e.g., when STmin is 2.0 ms and 0.3 ms).

Figure 8:
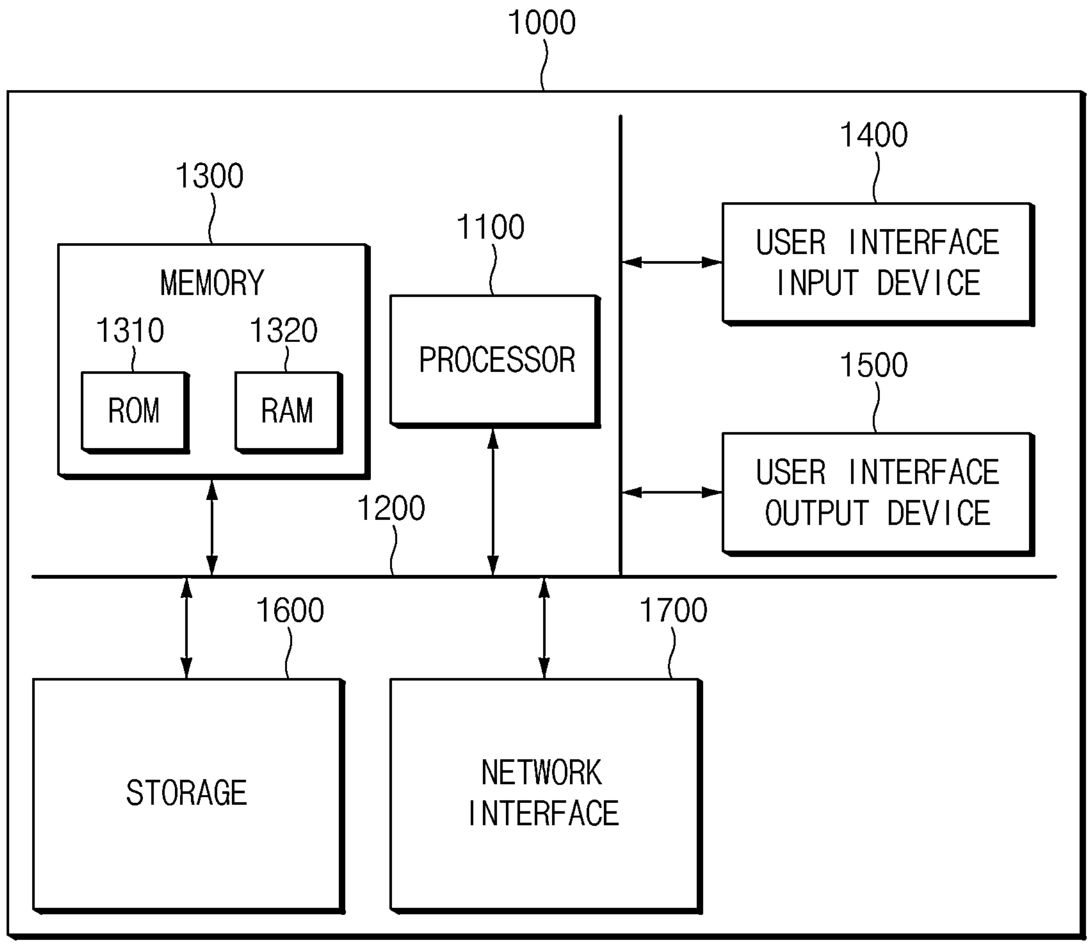
FIG. 8 is a drawing illustrating a computing system associated with a gateway apparatus and a control method thereof.

FIG. 8 is a drawing illustrating a computing system associated with a gateway apparatus and a control method thereof.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (read-only memory) 1310 and a RAM (random access memory) 1320.

Accordingly, the operations of the method or algorithm described in connection the present disclosure may be directly implemented with hardware, software, or a combination of hardware and software, which is executed by the processor 1100. The software module may reside on a storage medium (that is, the memory 1300 and/or the storage 1600) such as a RAM, a flash memory, a ROM, an erasable programmable ROM (EPROM), an electrically erasable programmable ROM (EEPROM), a register, a hard disc, a removable disk, and a compact disc ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to example embodiment(s) and the accompanying drawings, the present disclosure is not limited thereto, but may be variously modified and altered by those skilled in the art to which the present disclosure pertains without departing from the spirit and scope of the present disclosure claimed in the following claims.

The example embodiments described herein may be implemented with hardware components, software components, and/or a combination of hardware components and software components. For example, the devices, methods, and components described in the example embodiment(s) may be implemented using general-use computers or special-purpose computers, such as a processor, a controller, an arithmetic logic unit (ALU), a digital signal processor, a microcomputer, a field programmable array (FPGA), a programmable logic unit (PLU), a microprocessor, or any device which may execute instructions and respond. A processing unit may perform an operating system (OS) or a software application running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively instruct the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one computer-readable storage media.

The methods according to the present disclosure may be implemented in the form of program instructions which may be executed through various computer means and may be recorded in computer-readable media. The computer-readable media may include program instructions, data files, data structures, and the like alone or in combination, and the program instructions recorded on the media may be specially designed and configured for an example or may be known and usable to those skilled in the art of computer software. Examples of computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter.

The above-described hardware devices may be configured to act as one or a plurality of software modules to perform the operations of the example embodiment(s), or vice versa.

Even though the embodiments are described with reference to restricted drawings, it may be obviously to one skilled in the art that the embodiments are variously changed or modified based on the above description. For example, adequate effects may be achieved even if the foregoing processes and methods are carried out in different order than described above, and/or the aforementioned components, such as systems, structures, devices, or circuits, are combined or coupled in different forms and modes than as described above or be substituted or switched with other components or equivalents.

A description will be given of effects of the gateway apparatus and the control method thereof.

The gateway apparatus may store a protocol data unit (PDU) transmitted from a first module in one shared buffer and transmit the stored PDU to a second module, thus reducing a time required for reprogramming and reducing the amount of memory requirement.

Furthermore, the gateway apparatus may search for indexes paired with a plurality of PDUs stored in a shared buffer of a router module using a binary search and may transmit the found PDUS to a module different from a first module to transmit a PDU transmitted from the first module to the shared buffer to the module different from the first module, thus reducing a routing time of the PDU.

In addition, various effects ascertained directly or indirectly through the present disclosure may be provided.

Therefore, other implements, other embodiments, and equivalents to claims are within the scope of the following claims.

Therefore, the present disclosure is not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A gateway apparatus comprising:

at least one processor; and memory storing instructions that are configured to be executed by the at least one processor to cause the gateway apparatus to:

select a first protocol data unit (PDU) to be sent from a first network node to a second network node different from the first network node;

based on the first PDU being sent to a router, search, within a shared buffer associated with a routing path of the router, for a second PDU different from the first PDU;

store, based on determining that the second PDU is stored in the shared buffer, the first PDU in the shared buffer;

send, to the second network node and after deleting the second PDU from the shared buffer, the first PDU; and search, based on the second PDU being deleted from the shared buffer, the shared buffer for an index paired with the second PDU, wherein the instructions are further configured to be executed by the at least one processor to cause the gateway apparatus to:

sort a plurality of PDUs based on a plurality of indexes stored in the shared buffer; and perform a first search, among indexes paired with the sorted PDUs and using binary search, for a target index, of the plurality of indexes, that is equal to as the index paired with the second PDU.

2. The gateway apparatus of claim 1, wherein the instructions are further configured to be executed by the at least one processor to cause the gateway apparatus to set, based on the first PDU being stored in the shared buffer, a delay time associated with a controller area network (CAN) communication protocol.

3. The gateway apparatus of claim 1, wherein the instructions are further configured to be executed by the at least one processor to cause the gateway apparatus to store, in the shared buffer and together with the first PDU, an index paired with the first PDU.

4. The gateway apparatus of claim 3, wherein the index indicates the second network node.

5. The gateway apparatus of claim 1, wherein the instructions are further configured to be executed by the at least one processor to cause the gateway apparatus to:

delete, from the shared buffer and based on finding the target index via the first search, a third PDU paired with the target index; and perform a second search, among the plurality of indexes stored in the shared buffer and using binary search, for the target index.

6. The gateway apparatus of claim 5, wherein the instructions are further configured to be executed by the at least one processor to cause the gateway apparatus to send, based on not finding the target index via the second search, the first PDU to the second network node.

7. The gateway apparatus of claim 1, wherein the instructions are further configured to be executed by the at least one processor to cause the gateway apparatus to:

delete, from the shared buffer based on a time at which at least one of the plurality of PDUs paired with the target index is stored in the shared buffer and further based on the target index comprising a plurality of target indexes, the at least one of the plurality of PDUs; and perform a second search, among the plurality of indexes stored in the shared buffer and using binary search, for the target index.

8. The gateway apparatus of claim 1, wherein the instructions are further configured to be executed by the at least one processor to cause the gateway apparatus to perform, based on the first PDU being sent to the second network node, reprogramming of an electronic control unit (ECU) associated with the first PDU.

9. A gateway control method comprising:

selecting a first protocol data unit (PDU) to be sent from a first network node to a second network node different from the first network node;

based on the first PDU being sent to a router, searching, within a shared buffer associated with a routing path of the router, for a second PDU different from the first PDU;

storing, based on determining that the second PDU is stored in the shared buffer, the first PDU in the shared buffer; and sending, to the second network node and after deleting the second PDU from the shared buffer, the first PDU, wherein the method further comprises:

sorting a plurality of PDUs based on a plurality of indexes stored in the shared buffer;

performing a first search, among indexes paired with the sorted PDUs and using binary search, for a target index, of the plurality of indexes, that is equal to as an index paired with the second PDU; and searching, based on the second PDU being deleted from the shared buffer, the shared buffer for the index paired with the second PDU.

10. The gateway control method of claim 9, wherein the storing of the first PDU comprises:

setting, based on the first PDU being stored in the shared buffer, a delay time associated with a controller area network (CAN) communication protocol.

11. The gateway control method of claim 9, wherein the storing of the first PDU comprises:

storing, in the shared buffer and together with the first PDU, an index paired with the first PDU.

12. The gateway control method of claim 11, wherein the index indicates the second network node.

13. The gateway control method of claim 9, wherein the performing of the first search comprises:

deleting, from the shared buffer and based on finding the target index via the first search, a third PDU paired with the target index; and performing a second search, among the plurality of indexes stored in the shared buffer and using binary search, for the target index.

14. The gateway control method of claim 13, wherein the performing of the second search comprises:

sending, based on not finding the target index via the second search, the first PDU to the second network node.

15. The gateway control method of claim 9, wherein the performing of the first search comprises:

deleting, from the shared buffer based on a time at which at least one of the plurality of PDUs paired with the target index is stored in the shared buffer and further based on the target index comprising a plurality of target indexes, the at least one of the plurality of PDUs; and performing a second search, among the plurality of indexes stored in the shared buffer and using binary search, for the target index.

16. The gateway control method of claim 9, further comprising:

performing, based on the first PDU being sent to the second network node, reprogramming of an electronic control unit (ECU) associated with the first PDU.

17. A gateway apparatus comprising:

at least one processor; and memory storing instructions that are configured to be executed by the at least one processor to cause the gateway apparatus to:

select a first protocol data unit (PDU) to be sent from a first network node to a second network node different from the first network node, wherein the first PDU is associated with an electronic control circuit;

based on the first PDU being sent to a router, search, within a shared buffer associated with a routing path of the router, for a second PDU different from the first PDU;

store, based on determining that the second PDU is stored in the shared buffer, the first PDU in the shared buffer;

sort a plurality of PDUs based on a plurality of indexes stored in the shared buffer;

perform a first search, among indexes paired with the sorted PDUs and using a search scheme, for a target index, of the plurality of indexes, that is equal to as an index paired with the second PDU;

after deleting the second PDU from the shared buffer, search the shared buffer for the index paired with the second PDU; and send, to the second network node and after deleting the second PDU from the shared buffer, the first PDU.

18. The gateway apparatus of claim 17, wherein the first PDU is for reprograming or updating of software associated with an electronic control circuit of a plurality of electronic control circuits of a vehicle.

19. The gateway apparatus of claim 17, wherein, before sending the first PDU to the second network node, the shared buffer is searched for the index paired with the second PDU.

20. The gateway apparatus of claim 17, wherein the instructions are further configured to be executed by the at least one processor to cause the gateway apparatus to:

based on the sending of the first PDU to the second network node, cause reprograming or updating of software associated with an electronic control circuit of a vehicle.

* * * * *